No. 726,810. PATENTED APR. 28, 1903.
E. WILKINSON.
COFFEE OR TEA POT.
APPLICATION FILED SEPT. 18, 1902.
NO MODEL.
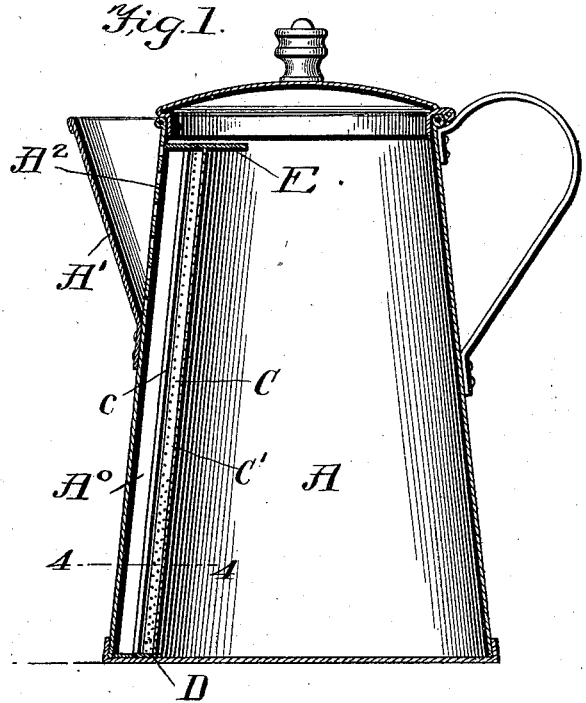
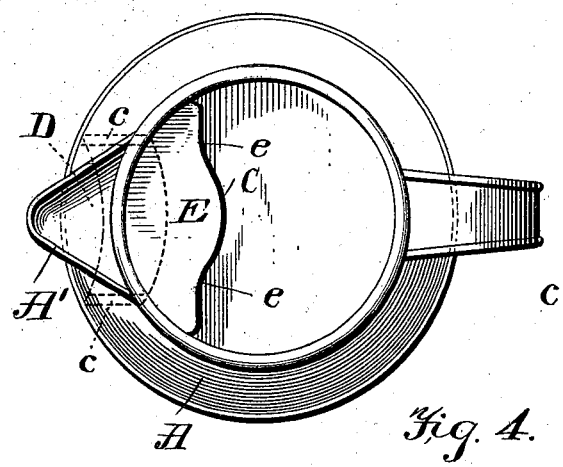
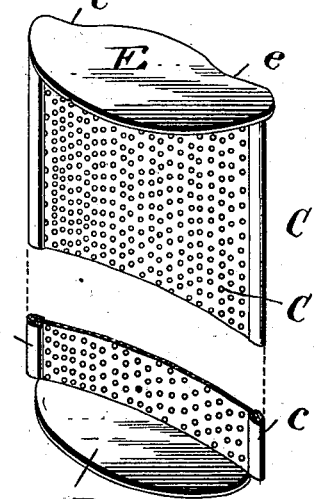
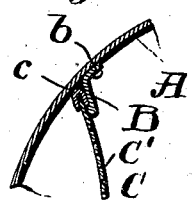

UNITED STATES PATENT OFFICE.

ERNEST WILKINSON, OF WASHINGTON, DISTRICT OF COLUMBIA, ASSIGNOR TO C. W. THOMPSON, OF MEMPHIS, TENNESSEE.

COFFEE OR TEA POT.

SPECIFICATION forming part of Letters Patent No. 726,810, dated April 28, 1903.

Application filed September 18, 1902. Serial No. 123,941. (No model.)

*To all whom it may concern:*

Be it known that I, ERNEST WILKINSON, a citizen of the United States, residing at Washington, in the District of Columbia, have invented certain new and useful Improvements in Coffee or Tea Pots; and I do hereby declare the following to be a full, clear, and exact description of the invention, such as will enable others skilled in the art to which it appertains to make and use the same.

My invention relates to improvements in coffee or tea pots; and it consists of certain novel features that will be hereinafter described and claimed.

Reference is had to the accompanying drawings, in which the same parts are indicated by the same letters throughout the several views.

Figure 1 is a central vertical section through the pot. Fig. 2 is a plan view of the pot with the top removed. Fig. 3 is a perspective view of the detachable strainer used in the pot, and Fig. 4 is a section along the line 4 4 of Fig. 1.

A represents the body of the pot, having the usual spout A' with the perforated portion $A^2$. Along the inside of the pot are two parallel guide-ribs B, riveted, soldered, or otherwise secured to the body of the pot, as at *b*. (See Fig. 4.) Between these guide-ribs a long screen C slides. This screen is composed of a perforated plate C', having beads *c* on its edges, and a bottom plate D, which serves as a stiffener and also to prevent the passage of solid particles beneath the strainer should it not be shoved down far enough.

To the top of the strainer is secured a combined cap-piece and handle E, which may be provided with indented portions *e* for greater convenience in lifting the same. The strainer is inserted by simply shoving it down between the guide-ribs B and is raised by placing the fingers under the rear edge of the cap E. When the strainer is in place in the pot, the bottom plate D and the cap E will prevent the coffee-grounds or tea-leaves from entering the passage $A^0$ (see Fig. 1) from either the top or bottom of the strainer, and the perforated plate C' will furnish a wide area for the straining process, and thus the fluid may be poured out quite rapidly.

The rearward projection of the cap E serves not only as a grip-piece, the two fingers preferably being placed beneath the indentations *e*, but this rearward projection also serves to prevent any fluid from passing over the top of the strainer and possibly leaking out of the top of the pot, as would happen if the cover on the pot was removed or fell off if the pot is tilted too much.

It will be seen that the strainer may be taken out of the pot and thoroughly cleansed and the obstructions in the holes cleaned out when desired.

It will be obvious that various modifications might be made in the herein-described invention which might be used without departing from the spirit of my invention.

I claim—

In a coffee or tea pot, the combination with the main body of the pot, of a pair of parallel guides secured therein, and a curved strainer provided with beaded edges adapted to slide in said guides, the said strainer having a solid plate secured to the bottom of the same curved to fit in the recesses between the body of the pot and the strainer, and also a solid plate secured to the top of the strainer and projecting on both sides thereof, the front face being curved to fit in the recesses between the strainer and the body of the pot to prevent the escape of the liquid above the same on the inside of the strainer, and a projection on the said plate on the opposite side of the strainer serving as a dam to prevent the overflow of the liquid through the top of the pot, and also a handle to facilitate the withdrawal of the strainer when desired, the said rearward projection being indented as shown, substantially as and for the purposes described.

In testimony whereof I affix my signature in presence of two witnesses.

ERNEST WILKINSON.

Witnesses:
FRANK D. BLACKISTONE,
FRED W. ENGLERT.